United States Patent
Golab et al.

(10) Patent No.: US 9,262,504 B2
(45) Date of Patent: Feb. 16, 2016

(54) METHODS, SYSTEMS, AND PRODUCTS FOR MAINTAINING DATA CONSISTENCY IN A STREAM WAREHOUSE

(75) Inventors: Lukasz Golab, Morris Plains, NJ (US); Theodore Johnson, New York, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 601 days.

(21) Appl. No.: 13/027,486

(22) Filed: Feb. 15, 2011

(65) Prior Publication Data

US 2012/0209817 A1  Aug. 16, 2012

(51) Int. Cl.
*G06F 17/30* (2006.01)

(52) U.S. Cl.
CPC .... *G06F 17/30592* (2013.01); *G06F 17/30516* (2013.01)

(58) Field of Classification Search
CPC ............................ G06F 17/30592; G06F 11/60
USPC .......................................................... 707/600
See application file for complete search history.

(56) References Cited

U.S. PATENT DOCUMENTS

| | | | |
|---|---|---|---|
| 5,742,821 A * | 4/1998 | Prasanna | 718/102 |
| 6,463,273 B1 | 10/2002 | Day | |
| 6,745,021 B1 | 6/2004 | Stevens | |
| 7,315,894 B2 * | 1/2008 | Huntington et al. | 709/224 |
| 7,389,104 B2 | 6/2008 | Phillips et al. | |
| 7,725,565 B2 | 5/2010 | Li et al. | |
| 7,752,259 B2 | 7/2010 | Weiser et al. | |
| 7,808,378 B2 | 10/2010 | Hayden | |
| 2003/0069002 A1 | 4/2003 | Hunter et al. | |
| 2003/0163351 A1 | 8/2003 | Brown et al. | |
| 2007/0222589 A1 * | 9/2007 | Gorman et al. | 340/539.26 |
| 2008/0126960 A1 | 5/2008 | Naaman et al. | |
| 2008/0243863 A1 | 10/2008 | Kanaan | |
| 2009/0113423 A1 * | 4/2009 | Hiltgen et al. | 718/1 |
| 2009/0124232 A1 | 5/2009 | D'Arcy et al. | |
| 2009/0163170 A1 | 6/2009 | Norp et al. | |
| 2009/0311986 A1 | 12/2009 | Bose et al. | |
| 2010/0042429 A1 | 2/2010 | Dixit | |
| 2010/0161569 A1 * | 6/2010 | Schreter | 707/696 |
| 2010/0175006 A1 | 7/2010 | Li | |
| 2010/0316196 A1 | 12/2010 | Jokinen | |
| 2010/0318424 A1 | 12/2010 | Lavalle | |
| 2012/0005190 A1 * | 1/2012 | Faerber et al. | 707/718 |

OTHER PUBLICATIONS

Golab, Lukasz et al. Stream Warehousing with DataDepot. ACM. SIGMOD Jun. 29-Jul. 2, 2009.*

Zhuge, Yue et al. Multiple View Consistency for Data Warehousing. IEEE. 2009.*

* cited by examiner

*Primary Examiner* — Hosain Alam
*Assistant Examiner* — Tuan-Khanh Phan
(74) *Attorney, Agent, or Firm* — Scott P. Zimmerman, PLLC

(57) ABSTRACT

Methods, systems, and products characterize consistency of data in a stream warehouse. A warehouse table is derived from a continuously received a stream of data. The warehouse table is stored in memory as a plurality of temporal partitions, with each temporal partition storing data within a contiguous range of time. A level of consistency is assigned to each temporal partition in the warehouse table.

14 Claims, 10 Drawing Sheets

METHODS, SYSTEMS, AND PRODUCTS FOR MAINTAINING DATA CONSISTENCY IN A STREAM WAREHOUSE

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Exemplary embodiments generally relate to electrical computers and to digital processing systems, to multicomputer data transferring, to database and file management, and to artificial intelligence and, more particularly, to computer network managing, to data warehousing, to file or database maintenance, and to knowledge processing systems.

A stream warehouse is a data stream management system that stores a very long history (e.g., years or decades) of information. The data stream management system may continuously ingest data from one or more data feeds. The data stream management system may then process a collection of long-running queries over these feeds. Queries may range from real-time alerting and diagnostics to long-term data mining. However, continuously loading data from many different and uncontrolled sources into a real-time stream warehouse introduces a problem: users want results in as timely a fashion as possible, but stable results often require lengthy synchronization delays.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
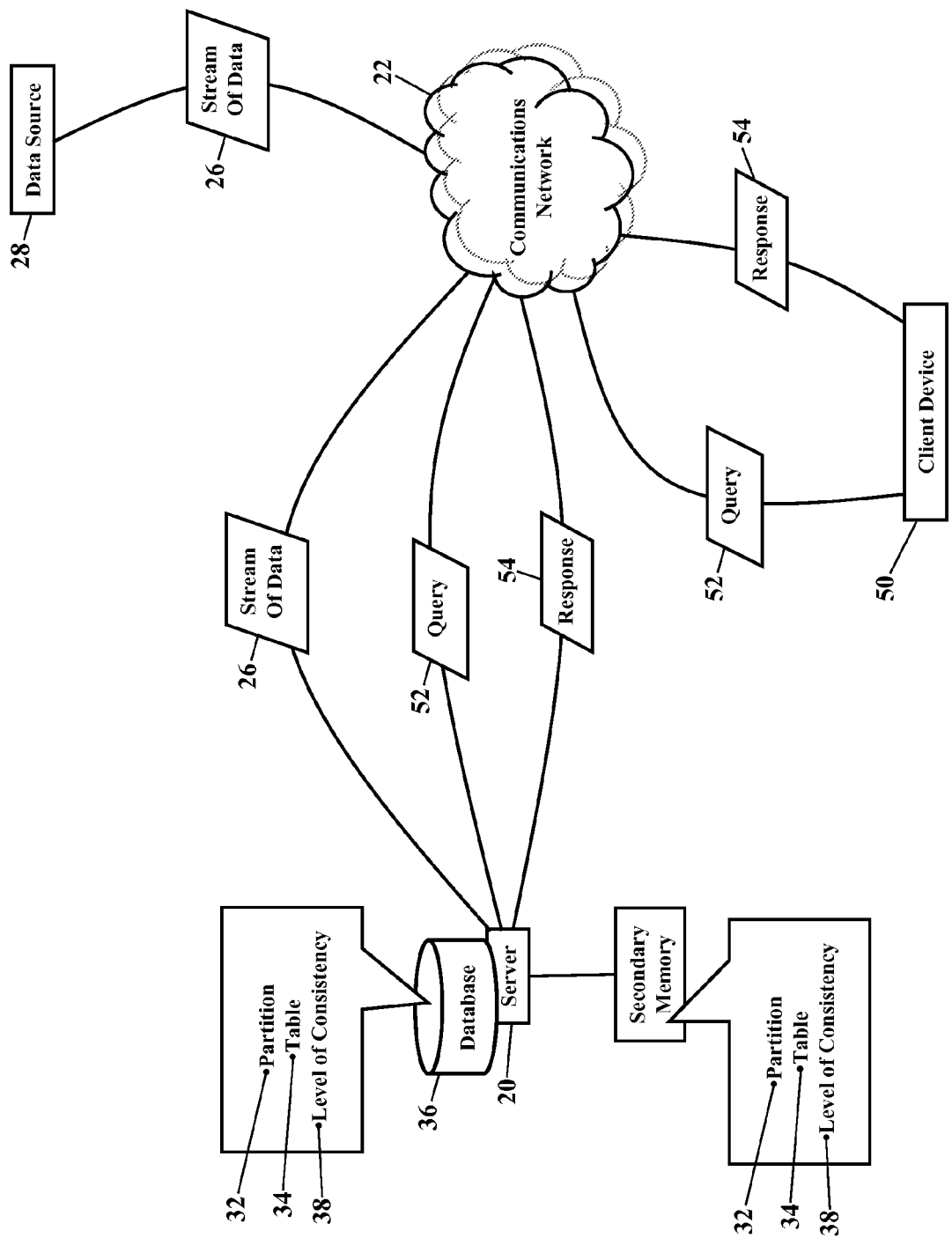
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a client-server network architecture that stores, or warehouses, one or more streams of data. A server 20 communicates with a communications network 22 and receives one or more streams 26 of data. Each stream 26 of data originates from a data source 28. FIG. 1, for simplicity, only illustrates one (1) data source 28. In an actual stream warehouse, though, the server 20 may receive hundreds of streams 26 of data from hundreds of data sources 28. Portions of each stream 26 of data may be partitioned into one or more partitions 32, processed, and stored as one or more tables 34 in memory (such as a database 36, as later paragraphs will explain). The partitions 32 and tables 34 may additionally or alternatively be stored in secondary memory (such as a disk drive, USB drive, or other peripheral memory). A level 38 of consistency is then calculated for each table 34, and the level 38 of consistency describes a consistency of the data in the table 34 (as later paragraphs will also explain).

The server 20 may also accept queries. As FIG. 1 illustrates, the server 20 may also communicate with a client device 50 via the communications network 22. The client device 50 issues a query 52 that communicates to the server 20. The query 52 typically seeks some analysis of data or information stored in the table(s) 34 in the database 36. When the server 20 receives the query 52, the server 20 executes the query 52 and sends a response 54 to the client device 50.

Exemplary embodiments describe several intuitive definitions of data consistency in a stream warehouse that range from very weak to very strong. These definitions allow users of the data warehouse to understand the "goodness" of the data and whether the data are "stable" or can change over time. Exemplary embodiments also describe an algorithm that determines whether a given table 34 in a stream warehouse has a desired consistency level 38. This algorithm starts by looking at the consistency properties of source data and works its way through all the tables 34 in the warehouse (e.g., the database 36). Exemplary embodiments may thus guarantee consistency results to the users. Exemplary embodiments also describe another algorithm that determines whether a given table 34 should be updated or whether it should wait until the source data are more consistent or stable before being updated. This algorithm starts at a given table 34 and works its way down towards the source data to make sure that the data are stable. Exemplary embodiments may thus improve the efficiency of a stream warehouse by preventing the warehouse from repeatedly updating and revising the tables 34 using inconsistent data. Exemplary embodiments, instead, may wait until the data are stable and perform an update only once.

Exemplary embodiments thus provide users of a stream data warehouse some guarantees about the consistency or goodness of the data that they are accessing. Without consistency guarantees, users do not know how to trust the data (and any analysis performed using the data), which means that such a stream warehouse would be of very limited use in practice. Exemplary embodiments thus greatly improve the efficiency of updates in a stream warehouse. In other words, the warehouse will be able to load more data more quickly. This is an important performance requirement, as the goal of a stream warehouse is to continually load data as rapidly as possible.

Figure 2:
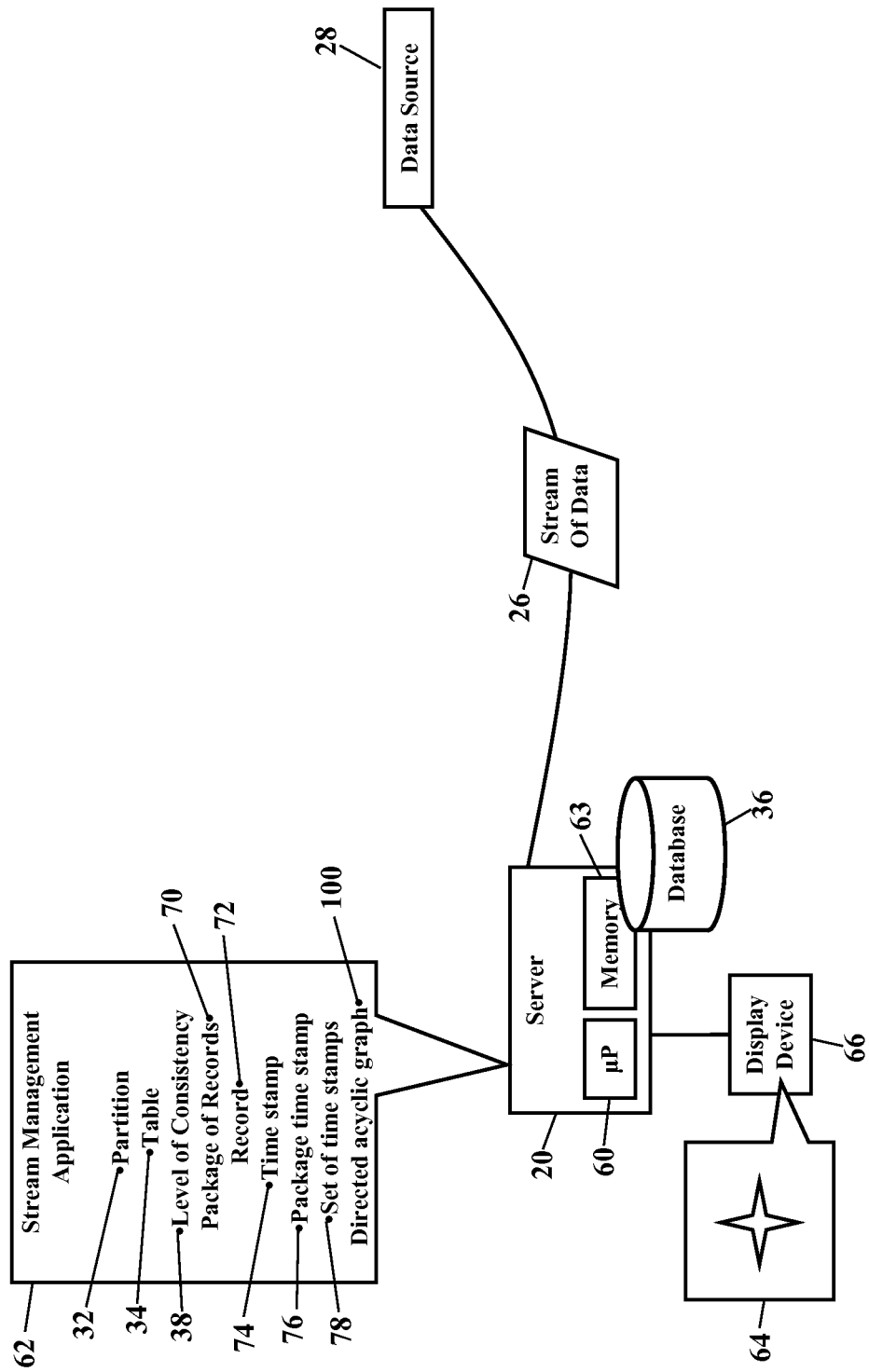
FIG. 2 is a more detailed schematic illustrating the operating environment, according to exemplary embodiments.

FIG. 2 is a more detailed schematic illustrating the operating environment, according to exemplary embodiments. The server 20 has a processor 60 (e.g., "μP"), application specific integrated circuit (ASIC), or other component that executes a stream management application 62 stored in memory 63. The stream management application 62 may cause the processor 60 to produce a graphical user interface ("GUI") 64. The graphical user interface 64 is illustrated as being visually produced on a display device 66, yet the graphical user interface 64 may also have audible features. The stream management application 62, however, may operate in any processor-controlled device, as later paragraphs will explain.

The server 20 receives the one or more streams 26 of data. Each stream 26 of data may be termed a data feed from its respective data source 28. The server 20 may continuously ingest data from each stream 26 of data, and the server 20 may process a collection of long-running queries over these feeds. Many data sources 28 may produce a data feed: a stream of measurements, log files delivered from an external source, a log of updates to a transactional store, and so on. Each stream 26 of data may regularly present a package 70 of records for ingestion. Each record 72 in a package 70 of records may be annotated or tagged with a time stamp 74 (e.g., a date and time) of observation (or some observation time interval). The package 70 of records may itself be time-stamped with a package time stamp 76 of delivery or reception. A set 76 of timestamps associated with the package 70 of records is generally highly correlated with the package time stamp 74 of date and time of delivery.

Figure 3:
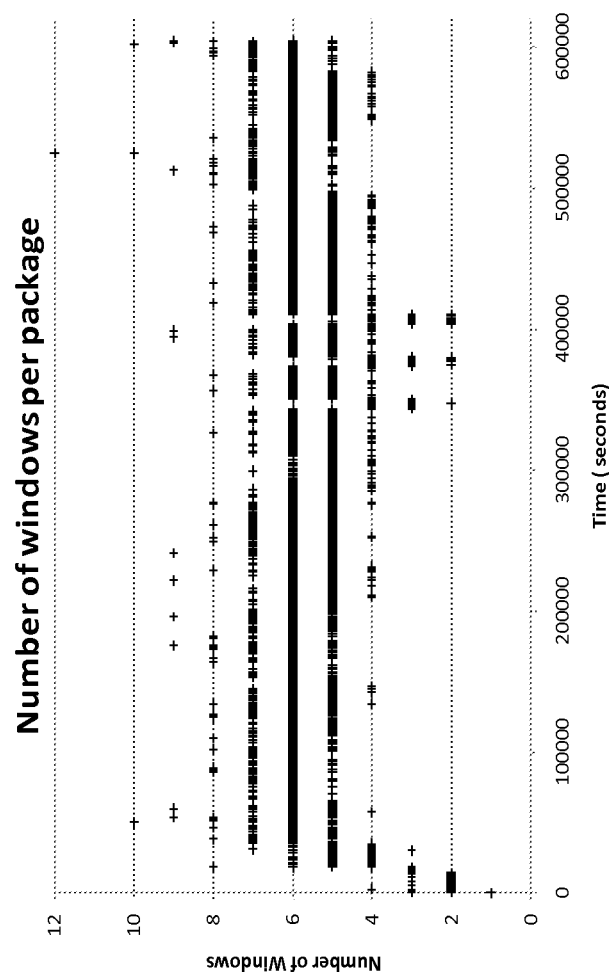
FIG. 3 is a chart illustrating smearing of data over time.

In practice, though, the stream 26 of data may be disordered. FIG. 3 is a chart illustrating smearing of data over time. The inventors have noticed that any given package 70 of records may contain records 72 with a range of time stamps 72 and/or 74. This behavior is not unexpected, as data may be gathered from world-wide network elements. The inventors investigated this disordered phenomenon by examining the data arrivals of several DARKSTAR tables. The inventors, for example, examined data arrivals containing five minute statistics about router performance (termed table "C"). A package 70 of records, in other words, normally arrives once every five minutes. The inventors found, however, that twenty three percent (23%) of the packages (covering a 10-day period) contained some data for a previous five-minute period, and some packages contained data up to an hour old (the packages also frequently arrive late). In another table (termed table "T"), which was loaded at one-minute intervals, every package except one contained records for a previous time period (observed over a seven-day interval). A third table (table "S"), also loaded at 1-minute intervals, showed the greatest disorder: each package contained data for an average of 4.5 previous time periods. The degree of disorder changes over time, as illustrated in FIG. 3, which plots the number of time periods with at least one record 72 in any given package 70 of records. The inventors hypothesize that the degree of disorder within a package 70 of records is related to load on the data delivery system.

The data sources 28 may also be unsynchronized. Different data feeds (e.g., the streams 26 of data) may use different collection and delivery mechanisms. Different data feeds, therefore, may tend to have different degrees of currency. The inventors considered the previously mentioned router alerts (e.g., tables "C" and "T") and a third feed (table "WD") containing packet loss and delay measurements. The lateness of the most recent data in each of these tables was sampled. On average, the "C" data was six minutes behind, while the "T" data was seventeen minutes behind. The "WD" data feed was forty seven minutes behind. Again, the inventors believe that the currency of these feeds changes according to the load on their respective data delivery system.

Late arrivals may also be common. Significantly late arrivals are not common enough to readily measure. In the inventors' experience, though, late arrivals occur often enough to be an operational concern. Often the root cause of a late arrival is a temporary failure of a component in the data delivery system. Occasionally, a portion of the source data is discovered to be corrupt and needs re-acquisition and reloading.

Figure 4:
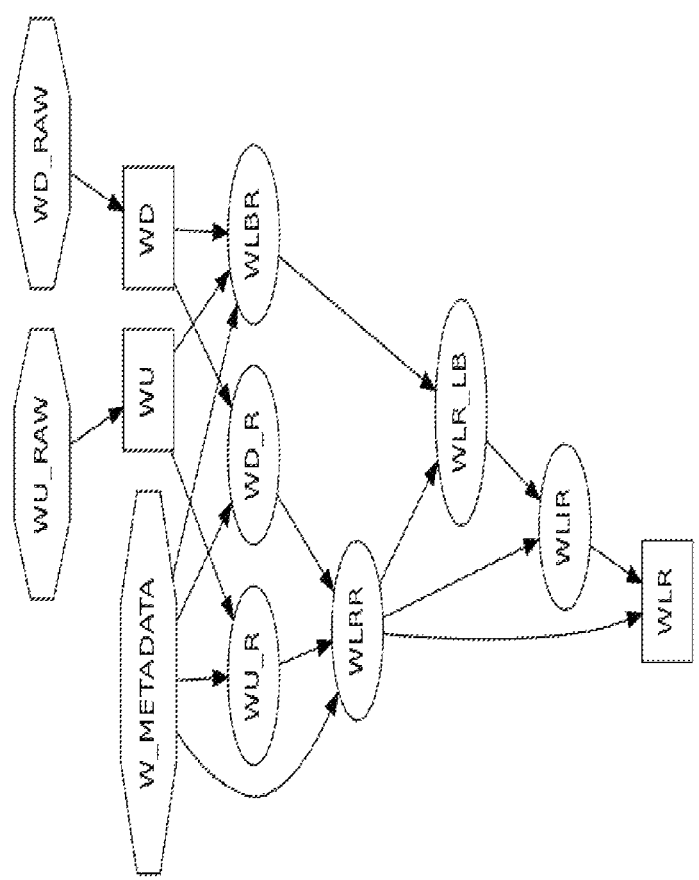
FIG. 4 is flow diagram illustrating a fragment of a real-time network monitoring application.

Given the large data volumes and high temporal disorder in the source streams 26 of data in a stream warehouse, conventional in-memory buffering techniques are prohibitively expensive. Compounding the problem are complex view hierarchies. For example, FIG. 4 is flow diagram illustrating a fragment of a real-time network monitoring application which searches for misbehaving routers, involving the "WD" and other data (the full application has another twenty-one data tables). The octagons are the base tables, while boxes identify tables that are often queried. These types of applications are too large to manage using conventional means and too complex to be understood without consistency assurances.

Another problem is that there can be multiple notions of consistency that users desire. For example, some DARKSTAR users (or applications) require access to router alerts (e.g., the "T" data table explained above) as soon as possible, and these users need to correlate the data with the most recent possible router performance reports (e.g., the "C" data table). Other users (or other materialized views) might need stable answers to queries based on these streams, even at the cost of a moderate synchronization delay.

This disclosure thus helps resolve issues encountered by users of stream warehouses (such as the AT&T® DATADEPOT® stream warehouse). Although exemplary embodiments are described using terms associated with the AT&T® DATADEPOT® stream warehouse, the model applies to any and all stream warehouses.

The server 20 and the database 36 (or stream warehouse) may be characterized by streaming inputs, such as the one or more streams 26 of data (illustrated in FIGS. 1 and 2). A stream warehouse, however, may also be characterized by a strong emphasis on the temporal nature of the data and by multiple levels of materialized views. To manage a long-term store of a stream 26 of data, the stream 26 of data may be split into the temporal partitions 32 (or panes or windows). Each temporal partition 32 stores data within a contiguous range of time (perhaps referenced by the time stamps 74 and/or 76). The collection of temporal partitions 32 of the stored stream 26 of data comprises a complete and non-overlapping range of the stored window of the stream 26 of data. A feed package 70 of records may contain data for multiple partitions 32 (as illustrated in FIG. 3). The storage of a high-volume stream 26 of data may require additional partitioning dimensions.

Figure 5:
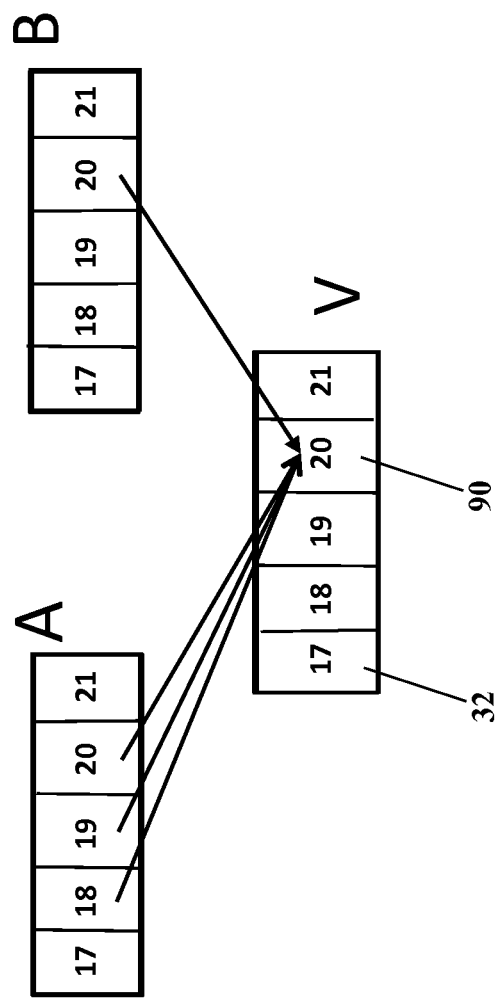
FIG. 5 is a schematic illustrating partition dependencies, according to exemplary embodiments.

FIG. 5 is a schematic illustrating partition dependencies, according to exemplary embodiments. The data warehouse maintains a collection of materialized views computed from the raw inputs to the server (illustrated as reference numeral 20 in FIGS. 1 and 2). Materialized views are used to accelerate a user's query by pre-computing an answer and to simplify data access by cleaning and de-normalizing tables. The stream warehouse typically has a large collection of materialized views arranged as a Directed Acyclic Graph (or "DAG"). The Directed Acyclic Graph tracks data dependencies, e.g., that view V is computed from streams A and B (FIG. 4 shows a data flow DAG, the reverse of a dependency DAG). The stream warehouse also tracks temporal dependencies, e.g., that data in V from 1:00 to 1:15 are computed from data in stream A from 1:00 to 1:15 and from data in B from 12:30 to 1:15 (as illustrated in FIG. 5).

Let V be a warehouse table. Assume that V has a timestamp field, V·ts, which tends to increase over time. Further, assume that every table V is temporally partitioned and that the partitions 32 are identified by integer values so that V(t) is the $t^{th}$ partition of V. Associated with V is a strictly increasing partitioning function $pt_v(t)$. Partition t of V contains all and only those data in V such that $$pt_v(t) \le V \cdot ts < pt_v(t+1).$$

Base tables are loaded in the memory 30 directly from a source stream 26 of data (for example, WU_RAW illustrated in FIG. 4). Derived tables (or materialized views) are defined by a query over other base and derived tables (for example, WU_R illustrated in FIG. 4). The inventors define S(V) to be the set of source tables of V, e.g., S(WU_R)={WU, W_METADATA}. The inventors also assume that all derived-table-defining queries exhibit temporal locality (e.g., they may be defined over a sliding window).

Let S be a table in S(V). Then Dep(V(t),S) is the set of partitions in S that supply data to V(t), and Dep(V(t)) is the set of all partitions 32 that supply data to V(t) regardless of the source table. For example, suppose that in FIG. 5 each partition 32 represents fifteen (15) minutes of data, and that partition #20 (illustrated as reference numeral 90) corresponds to 1:00 through 1:15. Then $$Dep(V(20),B)=\{B(20)\}$$

and $$Dep(V(20))=\{A(18),A(19),A(20),B(20)\}.$$

When any of the partitions 32 in Dep(V(20)) are updated, V(20) must also be updated (incrementally, if possible, or by being re-computed from scratch).

Exemplary embodiments may include consistency models. A basic notion of temporal consistency may assign one or more markers to each temporal partition 32 in a table 34. Consistency markers can be thought of as a generalization of punctuations, because multiple consistency levels would be used in general. Below, the inventors propose two related but different notions of consistency. The first, query consistency, defines properties of data in a partition 32 that determine if those data can be used to answer a query with a desired consistency level. The second, update consistency, propagates table consistency requirements and is used to optimize the processing of updates to the stream warehouse.

Query Consistency

A definition of query consistency starts at the base tables. For simplicity of disclosure, a minimal set of three levels of consistency is used. In practice, though, many more levels are desirable. This particular set of three levels is chosen because they are natural and they form a simple hierarchy, but they also illustrate some interesting aspects of query consistency. However, an actual implementation of a stream warehouse would likely use a more refined set of consistency levels, as will be later discussed.

Let B be a base table and let B(d) be one of its partitions 32. Then:

Open(B(d)) if data exist or might exist in B(d);
Closed(B(d)) if we do not expect any more updates to B(d) according to a supplied definition of expectation; e.g., that data can be at most 15 minutes late;
Complete(B(d)) if Closed(B(d)) and all expected data have arrived (i.e., no data are permanently lost).
The notions of Open and Closed consistency are the natural minimal and maximal definitions. Complete consistency is stronger, and it is spawned by AT&T® DATADEPOT® user requirements: only perform analysis on complete data partitions because otherwise one may get misleading results (however, Closed partitions are often acceptable to users). Of course, the vagaries of the raw data sources may make it difficult to precisely establish when a partition 32 has achieved one of these levels of consistency; this is similar to the problem of generating punctuations. However, several types of inference are possible:

If there is at least one record 72 in a partition 32, the record 72 may be marked as Open. However, a partition 32 might have Open consistency even though it is empty: no data might ever be generated for it. An empty base table partition 32 may thus be marked as Open if it can be inferred that some data could have arrived, e.g., if a temporally later partition 32 is non-empty.
Past or current usage may indicate that exactly five packages provide data for a partition and that packages rarely arrive more than one hour late. If so, a partition may be marked as both Closed and Complete if all five packages have arrived. If only four have arrived, but an hour has passed since the expected arrival time of the fifth one, the partition may be marked as Closed. If the fifth package never arrives, this partition never becomes Complete. In general, then, if an expected number of packages in a partition is known, arrival of all the expected packages may mark the partition as Closed and complete. If a maximum lateness in time is also known, the partition may be marked as closed when a timer establishes and counts down to the maximum lateness, even if not all expected packages have been received to close the partition.

The consistency of a partition 32 of a derived table is determined by the consistency of its source partitions. Each level of consistency has its own inference rules, and inference is performed for each consistency level separately. The most basic inference rule is as follows: for consistency level C, infer C(V(t)) if C(S(d)) for each S(d) in Dep(V(t)). However, by analyzing the query that defines a materialized view, exemplary embodiments may sometimes create a more accurate inference rule.

Consider an example set of inference rules using the set of three consistency levels. Let V be a derived table and let V(t) be one of its partitions.

Query Consistency Inference

Let RQD(V), a subset of S(V), be the non-empty set of tables referenced by "required" range variables, i.e., those used for inner join or intersection.

If RQD(V) is non-empty, then Open(V(t)) if for each S in RQD(V), there is a S(d) in Dep(V(t),S) such that Open(S(d)).

If RQD(V) is empty, then Open(V(t)) if there is a S(d) in Dep(V(t)) such that Open(S(d)).

Closed(V(t)) if Closed(S(d)) for each S(d) in Dep(V(t)).

Complete(V(t)) if Complete(S(d)) for each S(d) in Dep(V(t)).

The Closed and Complete consistency levels use the basic inference rule, but by analyzing the query that defines materialized view V one can avoid labeling a partition V(t) as Open when no data can be in it. Later paragraphs contain additional examples of query-dependent consistency inference rules.

The inference that a partition 32 of a derived table 34 has a particular consistency level is computed top-down (from source to dependent tables). Normally, this inference would be performed at view maintenance time by comparing source with destination consistency metadata. This maintenance can be performed globally or piecemeal. Note that the consistency of a partition 32 may change even though the partition 32 does not need to be updated, e.g., due to a base table partition becoming Closed as well as Open.

Figure 6:
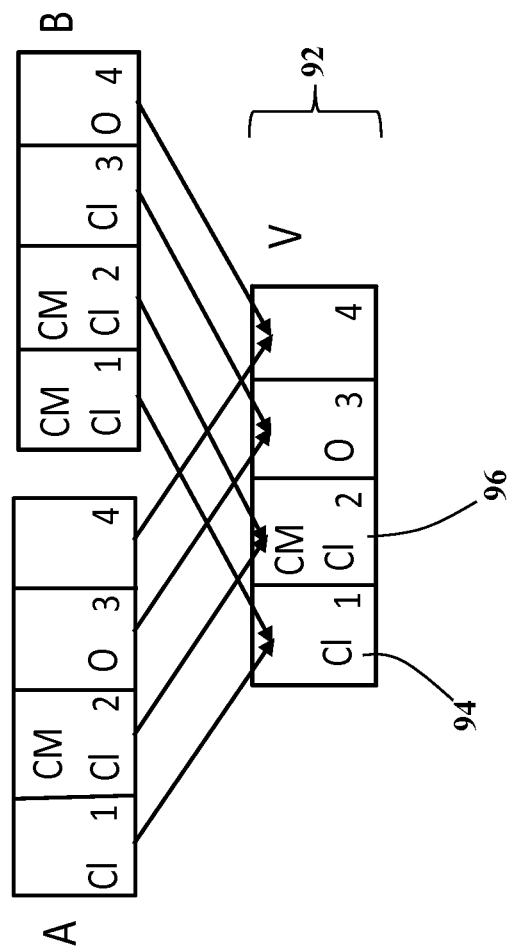
FIG. 6 is a schematic illustrating a table, according to exemplary embodiments.

FIG. 6 is a schematic illustrating the tables 34, according to exemplary embodiments. Table V (illustrated as reference numeral 92) is computed by an inner join of Table A and Table B. FIG. 6 illustrates a consistency marker 94 associated with each partition. Each consistency marker 94 may be Open, Closed, and Complete (illustrated, respectively, as "O," "Cl," and "CM"). An "O" marker may be omitted if a "Cl" marker exists. Partition #1 of V can be inferred to have Closed ("CL") consistency, as both sources are Closed, but not Complete consistency. Partition #2, however, can be inferred to be both "Closed" and "Complete," as its respective data sources (Table A, Partition #2 and Table B, Partition #2) are both closed ("Cl") and complete "CM"). Partition #3 of Table V is Open because both Table A and Table B may contribute an Open (or Closed) partition. Partition #4 of Table V cannot even be inferred to be Open, as one of its data sources (Table A, Partition #4) lacks a consistency marker.

Query consistency markers ensure the consistency of query results. In DARKSTAR® applications, ensuring temporal consistency may be important, but, very difficult without warehouse support. Applications such as RouterMiner and G-RCA enable real-time network troubleshooting by correlating data from feeds including C, S, T, WD (explained above) and many others; however, each of these feeds produces base tables with widely varying timeliness (as also explained above).

An outline of the procedure for ensuring the consistency of a query is to treat the query as a derived table and determine its partition dependencies. A query can be answered with a given level of consistency if that consistency level can be inferred from the set of all source partitions accessed by the query. A query that cannot be answered with the desired consistency can have its temporal range trimmed (or its consistency relaxed). For example, if we are performing a selection on table V in FIG. 6, and we require Complete consistency, then the inference rules state that the query can only be run on the data in partition #2 (illustrated as reference numeral 96).

While the proposed mechanism for ensuring query consistency is generally applicable, it can be confusing to users. A convenient way to summarize the state of a (base or derived) table is a consistency line. The C-consistency line of table V in FIG. 6 is the maximum value of pt such that all partitions V(t), t≤pt, have C(V(t)). A query that references tables $S_1$ through $S_n$ can be answered with C-consistency if it is restricted to accessing partitions of S, at or below the C-consistency line of $S_i$ for each i=1, . . . , n. The inventors have referred to the Open-consistency line as the leading edge of a table, and the Closed-consistency line as the trailing edge. A Complete-consistency line is likely of little value since some partitions might permanently fail to become Complete.

For example, in FIG. 6 the Open-line (leading edge) of Table V is partition #3, while the Closed-line (trailing edge) of Table V is partition #2. A Complete line may not be defined, as partition #1 is not Complete.

Case Study

Now given is an example of how applications can choose and exploit query consistency guarantees. Returning to FIG. 4, a fragment of one of the DARKSTAR® applications is illustrated. This application processes packet delay and packet loss measurements to issue network alarm events. These measurements are taken roughly every five minutes, with one measurement for each link in the communications network 22. A loss or delay alarm record is produced for a given link if there are four or more consecutive loss or delay measurements, respectively, that exceed a specified threshold. If a measurement for a given link is missing in a 5-minute window, it is considered to have exceeded the threshold for the purposes of alarm generation. In FIG. 4, WLR is the materialized view that contains loss alarm records, each record containing a link identification, the start and end times of the alarm, and the average packet loss and delay during the alarm interval. The size of each WLR partition is five minutes, which corresponds to the frequency of the underlying data feeds. The ovals in FIG. 4 correspond to intermediate views that implement the application logic (e.g., selecting measurements that exceed the threshold, computing the starting point of each alarm event, computing alarm statistics, etc.). To complete the application, a Web-based front end displays the current and historical alarms by periodically querying the WLR table.

Because this is a real-time alerting application, one may argue that WLR should have Open consistency; i.e., it should be loaded with all the available data at all times. However, the problem is that missing measurements are assumed to have exceeded the threshold. Thus, if an update to WLR is attempted before the latest measurements arrive, one may incorrectly assume that all of these measurements are missing and may generate false alarms. Instead, the inventors have found it more appropriate to use Closed consistency for WLR, with partitions closing at each 5-minute boundary. Note that Complete consistency may not be appropriate for this application, as the inventors do not want to delay the generation of network alarms for the data that have already arrived, even if a partition is not yet complete.

Update Consistency

In addition to understanding data semantics and query results, another use for consistency is to minimize the number of updates to a base table and view updates in a warehouse. For an example drawn from experience, consider a derived table V defined by an aggregation query which summarizes a real-time table S with once-per-5-minutes updates (with 5-minute partitions) into a daily grand-total summary (with per-day partitions). If V is updated every time S is updated, V would be updated about 288 times (i.e., 1440 minutes in a day divided by 5) before the day is closed out. If we are interested in the grand total rather than the running sum, this procedure for updating V is wasteful. Here, a partition of V is only useful if it has Closed consistency, so we should only compute it when it can be safely Closed.

The update consistency of a table 34 is the minimal consistency required by queries on it or its dependent tables, and determines when to refresh its partition(s). A partition of a table 34 may be computed only when it can be inferred to have a query consistency matching the desired update consistency.

Naïvely, one might require the warehouse administrator to mark each table 34 with its desired update consistency. However, any given table 34 may supply data to many derived tables, each with differing types of update consistency. An algorithm is thus needed for determining what kind of update consistency table S should enforce.

Furthermore, not every view is primarily intended for output. A table 34 might be materialized to simplify or accelerate the materialization of another table, or it might be a partial result shared by several tables (see, e.g., the application fragment in FIG. 4). We assume that output tables are marked as such (all leaf-level materialized views are output tables). A table 34 may be marked with one of the following labels:

Prefer_Open: a table that does not have to reflect the most recent data, but one whose partitions can be easily updated (in an incremental manner) if necessary; e.g., monotonic views such as selections and transformations of one other table;

Require_Open: a real-time table in which any possible data must be provided as soon as possible;

Prefer_Closed: Tables whose partitions are expensive to re-compute, such as joins and complex aggregation (depending on the incremental maintenance strategy);

Prefer_Complete: a table whose output is only meaningful if the input is complete.

All output tables may need to be marked with these initial labels, which may be more effort than the warehouse administrator cares to expend. By default, selection and union views may be marked Prefer_Open because they can be very easily updated. Join and aggregation views may be marked Prefer_Closed since it is more efficient to perform batch updates to them rather than continuously updating them whenever new data are available (or because users may not be interested in partial aggregates). We note that Prefer_Open is a "don't care" type of condition.

The algorithm for determining update consistency works in a reverse breadth-first search (BFS) of the data flow Directed Acyclic Graph (or "DAG"), starting from the leaf-level views and working to the roots (e.g., base tables) (the Directed Acyclic Graph is illustrated as reference numeral 100 in FIG. 2). When a table T is selected for processing, all of its dependent tables have received their final marking. To mark table T, we follow a resolution procedure. Let M be the set of dependent table markings, along with the marking of table T, if any (internal-use tables might not be marked).

The three levels 38 of consistency may form a hierarchy: Complete implies Closed, and Closed implies Open. The general resolution procedure is to choose the lowest level 38 of consistency in M, with the "don't care" consistency level as a fallback. Therefore the update consistency resolution procedure (see below) is simple and produces a single result. There is one complication: it is likely that not all base table partitions will ever be labeled Complete, and therefore we should use Complete update consistency only if all dependent tables use Complete update consistency.

The Update Consistency Resolution may be summarized as:

1. If Require_Open is in M, mark T as Require_Open
2. Else, if some label in M is Prefer_Closed, mark T as Prefer_Closed
3. Else, if all labels in M are Prefer_Complete, mark T as Prefer_Complete
4. Else, mark T as Prefer_Open.

Tables marked Require_Open or Prefer_Open use Open update consistency, while tables marked Prefer_Closed (resp. Prefer_Complete) use Closed (resp. Complete) update consistency.

Figure 7:
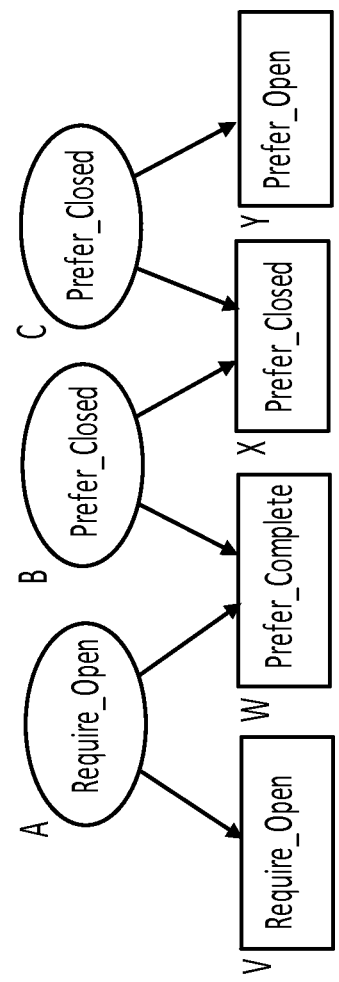
FIG. 7 is a schematic illustrating an example of an update consistency inference, according to exemplary embodiments.

FIG. 7 is a schematic illustrating an example of an update consistency inference, according to exemplary embodiments. Leaf tables (illustrated as "V," "W," "X," and "Y") are all output tables, indicated by a rectangle, with pre-assigned update levels 38 of consistency of (Require_Open, Prefer_Complete, Prefer_Closed, Prefer_Open), respectively. These tables are considered first in the reverse breadth-first search (BFS) search of the Directed Acyclic Graph (again, illustrated as reference numeral 100 in FIG. 2). When one of these tables is processed, its own label is the only entry in M, so each table in (V, W, X, Y) is assigned its preferred update consistency. Non-output tables (A, B, C) are processed next. When one of these tables is processed, the markings of its successor tables are the entries in M. For example, when table B is processed, the entries in M are (Prefer_Complete, Prefer_Closed), so the resolution procedure marks table B as Prefer_Closed.

An experimental evaluation is now given. To see the potential performance benefit of using update consistency, the inventors collected the number of updates performed on tables WU_RAW, WD_RAW, and WLR (illustrated in FIG. 3), over a 10 day, 18+ hour period. WU_RAW and WD_RAW (are supposed to) receive updates every 15 minutes; therefore 1033 updates to these tables are expected during the observation period. W_METADATA is another input, but it receives updates only once per day, so it is ignored in this analysis.

The implementation of DATADEPOT® measured here did not incorporate update consistency. The only update scheduling options available were immediate (update a table whenever one of its sources has been updated) and periodic (e.g., every 15 minutes). Because the W application is real-time critical, immediate scheduling was used to minimize data latency. The extensive use of joins in this application suggests that immediate updates are likely to be inefficient, since one will often perform an (inner) join update when data from only one range variable is available. Without an update consistency analysis, however, the warehouse has no basis for not performing an update when data from only one range variable is available, as the join might be an outer join, and which source table supplies the outer join range variable is not clear.

During the observation period, there were 1,364 updates to WU_RAW and 1,359 to WD_RAW. The excess over the expected 1,033 updates are due to late arrivals of some of the packages 70 of records that comprise the data in a partition 32 (recall the above discussion of disorder in data feeds). Under Open update consistency, the number of updates to WLR should be 1,033 plus one for each excess update to one of the RAW tables, for a total of 1,690 updates. We observed 4,702 updates to WLR; in other words, there were 3,012 unnecessary updates. The use of update consistency clearly has the potential to be a significant optimization as we could reduce the number of updates to WLR by 64 percent. If Closed consistency was used, we could reduce the number of updates by 78 percent.

Exemplary embodiments thus describe a general framework for computing and using query and update consistency. Exemplary embodiments may be extended to additional consistency levels, as long as one can produce safe inference rules.

As earlier paragraphs discussed, determining the level of consistency of a base table partition may be a matter of guesswork. Closed partitions are generally not really closed, as very late data might arrive, sources might provide revisions to previously loaded data ("Sorry, we sent you garbage"), and so on. Thus, exemplary embodiments may provide different levels of closed-ness according to different definitions. For example, WeakClosed(V(t)) might mean that the data are probably loaded and stable enough for queries, while Strong-Closed(V(t)) might mean a level of confidence that no more data will arrive and that process revisions are refused. The definition of Closed described above may correspond to WeakClosed here.

If reasonably accurate and stable statistics concerning late arrivals are known, exemplary embodiments may associate specific time-out values with various levels of closed-ness. For instance, it may be known that revisions and updates mostly occur within five minutes of the expected partition closing time, and very few occur an hour later. A similar example is X-Percent-Closed(V(t)), which indicates that X percent of the data will not change in the future. This consistency marker is motivated by nearly-append-only data feeds that the inventors have observed in the DARKSTAR® warehouse, which are mostly stable except for occasional revisions. Finally, different levels of completeness, such as X-Percent-Full(V(t)) may also be useful—the warehouse may maintain summary views whose results are acceptable as long as they summarize a sufficient fraction of the input.

The above types of consistency levels may be used to quantify and monitor data quality in a stream warehouse. For example, if the number of packages per partition is a fixed constant, multiple X-Percent Closed and Full consistency lines for various values of X may be tracked in order to understand the extent of missing and delayed data. Such consistency lines may also be useful for monitoring and debugging the warehouse update propagation algorithm. For example, if all the base tables are full, but recent derived table partitions are only twenty five percent full, or just open, then perhaps the warehouse is spending too much time trying to keep up with the raw inputs rather than propagating updates through materialized views. Future work may include a visual data quality tool based on consistency lines.

Conventionally-defined punctuations allow for group-wise processing, i.e., an assurance that all data within a group have arrived. Analogously, group-wise consistency guarantees may be provided. For example, if all data from routers in the European region is known to have arrived while still awaiting data from Southeast Asia routers. Propagating group-wise punctuation would require a more sophisticated analysis of the queries that define materialized views, e.g., that an aggregation query groups on the region column.

If we are willing to make increasingly detailed analyses of the queries that define tables, we can obtain a more refined and less restrictive set of consistency levels. Three additional types of consistency are:

NoNewRecords: no records will be added to the partition in the future, but some existing records may be removed (this may happen in views with negation);

NoFieldChange(K,F): If a record with key K exists in the partition, the value of fields K union F will not change in the future;

NoDeletedRecords: no records will be deleted from this partition in the future, but new records may be added (this occurs in monotonic views).

Now an explanation of a query and consistency levels is given. Suppose that table V is computed by outer joining tables B to A, and the join predicate is from a foreign key on A to a primary key on B. Then NoNewRecords(V) depends on NoNewRecords(A) and NoFieldChange(A) only, not on table B.

Update Consistency in the Presence of Multiple Hierarchies

The above discussion of update consistency resolution may assume that the collection of consistency levels form a hierarchy, e.g., Complete(V(t))=>Closed(V(t))=>Open(V(t)). However, a complex collection of levels of consistency is likely to have many incomparable definitions. For example, from WeakClosed(V(t)) we cannot infer 100-Percent-Full(V(t)), nor vice versa. Here it is explained how to resolve the update consistency of a table in a general setting.

Let Cn be the set of consistency classes available to the warehouse. Define a predicate Stronger(C1,C2), C1 and C2 in Cn, if C1 (V(t))=>C2(V(t)). Assume that the pair (Cn, Stronger) forms a directed acyclic graph, Gc, that includes all transitive edges.

Consistency classes such as Closed, in which some partitions might never reach the specified level of consistency, lead us to make additional definitions. For consistency level C in Cn, define Linear(C) if C(V(t))=>C(V(t-k)) for 0<k<t. Choose a default consistency level, Cdefault in Cn, to be the update consistency level to be used if the update consistency resolution procedure returns an empty result.

Let M be the set of dependent table markings, along with the marking of table V. Let Dep be the set of children of T in the data flow DAG. Then:

Update Consistency Resolution with Hierarchies
1. Mark a node C in Cn if
   a. Linear(C), and C in M.
   b. Not Linear(C), C in M, and for each D in Dep, the update consistency of D is C.
2. Let U be the marked nodes {C1} in Cn such that there is no C2 in Cn such that Stronger(C1,C2).
3. If U is non-empty
   a. Return U
   b. Else return {Cdefault}

Let U(V) be the set of update consistency levels returned by the update consistency resolution procedure. Then a partition V(t) is updated if we can infer consistency level Cu(V(T)) for some Cu in U(V).

Figure 8:
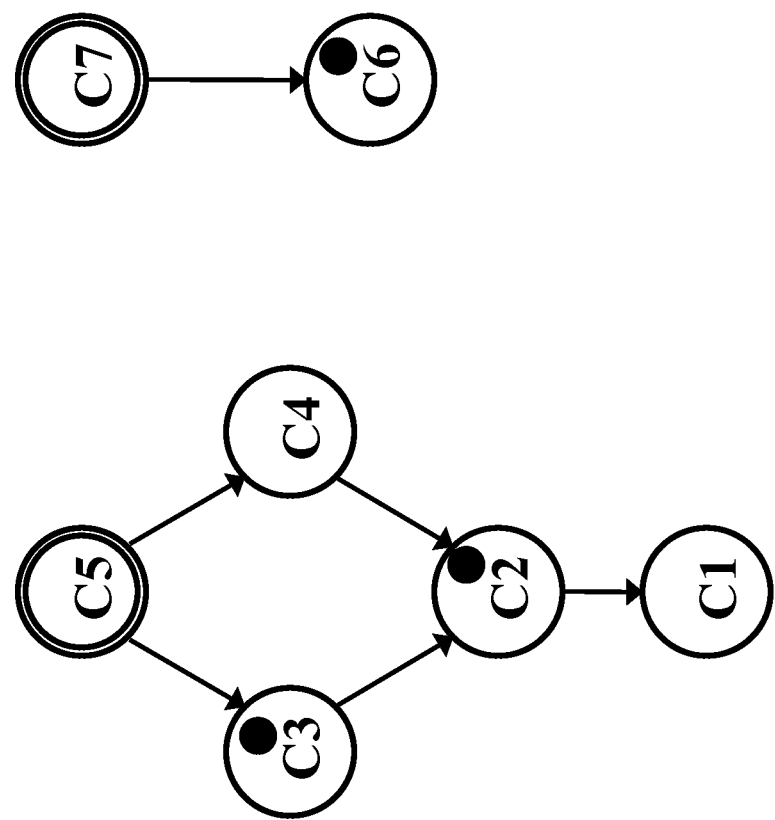
FIGS. 8 and 9 are schematics illustrating update consistency inference with multiple hierarchies, according to exemplary embodiments.
Figure 9:
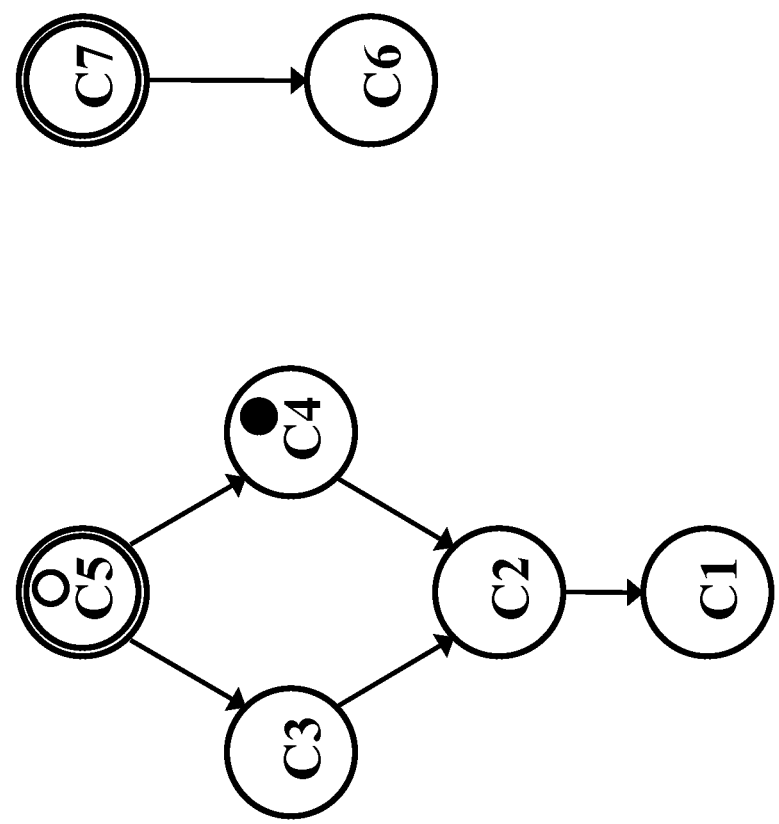

FIGS. 8 and 9 are schematics illustrating update consistency inference with multiple hierarchies, according to exemplary embodiments. Suppose that Cn={C1, ..., C7}, and that neither C5 nor C7 are linear (which are each illustrated with a double lined circle). Edges imply the Stronger relation (e.g., Stronger(C5,C3)), and we have removed transitive edges for clarity. In FIG. 8, M={C2, C3, C6}, so the result is that U={C3, C3}. In FIG. 9, M={C5, C4}. However, not every S in Dep has update consistency C5 (as witnessed by the C4 marking}, and therefore we do not use C5 in the resolution procedure. Therefore U={C4}.

Exemplary embodiments thus describe mechanisms for managing and exploiting the consistency of materialized views in a stream warehouse. The first, query consistency, propagates consistency properties from base tables to materialized views and provides consistency guarantees of query results. The second, update consistency, propagates table consistency requirements from materialized views to base tables and is used to optimize the management of a stream warehouse. Even though three basic types of consistency are discussed (Open, Closed, and Complete), exemplary embodiments encompass many more useful consistency definitions within the framework.

Figure 10:
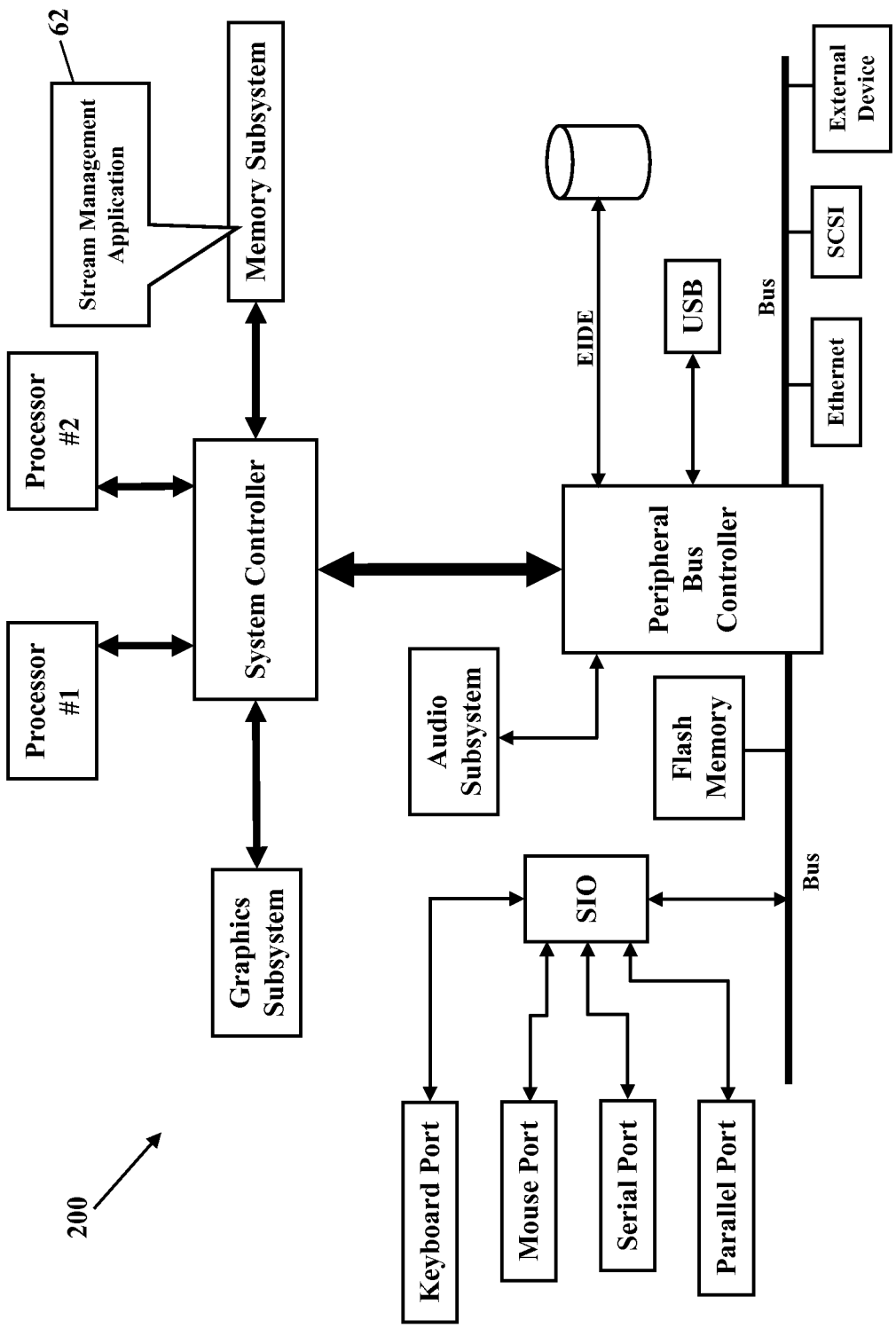
FIG. 10 depicts other possible operating environments for additional aspects of the exemplary embodiments.

FIG. 10 is a schematic illustrating still more exemplary embodiments. FIG. 10 is a generic block diagram illustrating the stream management application 62 operating within a processor-controlled device 200. As the paragraphs explained, the stream management application 62 may operate in any processor-controlled device 200. FIG. 10, then, illustrates the stream management application 62 stored in a memory subsystem of the processor-controlled device 200. One or more processors communicate with the memory subsystem and execute the stream management application 62. Because the processor-controlled device 200 illustrated in FIG. 10 is well-known to those of ordinary skill in the art, no detailed explanation is needed.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. A computer program product comprises processor-executable instructions for managing streams of data, as explained above.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:
   continuously receiving, by a server, a stream of data to a data warehouse;
   retrieving, by the server, a partitioning function to apply to the stream of data;
   partitioning, by the server, the stream of data into a plurality of temporal partitions according to the partitioning function, with each one of the plurality of temporal partitions containing a portion of the stream of data within a contiguous range of time and identified by an integer value;
   assigning, by the server, an open consistency to a single partition of the plurality of temporal partitions in response to determining at least one data record is contained within the single partition;
   assigning, by the server, a closed consistency to the single partition in response to determining no more data records are expected within the single partition;
   assigning, by the server, a complete consistency to the single partition in response to determining all expected data records have arrived within the single partition;
   assigning, by the server, a query consistency to the single partition based on at least one of the open consistency, the closed consistency, and the complete consistency;
   receiving, by the server, a query; and
   determining, by the server, an answer associated with the query based on the query consistency.

2. The method according to claim 1, further comprising answering the query.

3. The method according to claim 1, further comprising inferring the query consistency.

4. The method according to claim 1, further comprising determining the query consistency from a source partition in the plurality of temporal partitions.

5. The method according to claim 1, further comprising determining the query consistency from a set of source partitions in the plurality of temporal partitions.

6. The method according to claim 1, further comprising refreshing the plurality of temporal partitions according to an update consistency.

7. The method according to claim 1, further comprising:
   deriving a directed acyclic graph; and
   performing a reverse breadth-first search of the directed acyclic graph.

8. The method according to claim 1, further comprising marking a dependent table with a marker.

9. A system, comprising:
   a processor; and
   a memory storing code that when executed causes the processor to perform operations, the operations comprising:
   continuously receiving a stream of data to a data warehouse;
   deriving a source table from the data contained within the stream of data;
   retrieving a partitioning function to apply to the stream of data;
   partitioning, by the server, the stream of data into a plurality of temporal partitions according to the partitioning function, with each one of the plurality of temporal partitions containing a portion of the stream of data within a contiguous range of time and identified by an integer value;
   storing the plurality of temporal partitions as warehouse data tables;
   when at least one data record is contained within a single partition of the plurality of temporal partitions, then assigning an open consistency to the single partition;
   when no more data records are expected within the single partition, then assigning a closed consistency to the single partition;
   when all expected data records have arrived within the single partition, then assigning a complete consistency to the single partition;
   assigning a query consistency to the single partition based on at least one of the open consistency, the closed consistency, and the complete consistency;
   receiving the query; and
   answering the query with the query consistency.

10. The system according to claim 9, wherein the operations further comprise retrieving an inference rule associated with the open consistency.

11. The system according to claim 9, wherein the operations further comprise retrieving an inference rule associated with the closed consistency.

12. The system according to claim 9, wherein the operations further comprise retrieving an inference rule associated with the closed consistency.

13. The system according to claim 9, wherein the operations further comprise assigning the open consistency when the single partition contains no data records.

14. The system according to claim 9, wherein the operations further comprise comparing source metadata in a source partition to destination metadata in a destination partition.

\* \* \* \* \*